United States Patent
Tai et al.

(10) Patent No.: US 12,522,050 B2
(45) Date of Patent: Jan. 13, 2026

(54) THERMAL MANAGEMENT SYSTEM

(71) Applicant: FOXTRON VEHICLE TECHNOLOGIES CO., LTD., New Taipei (TW)

(72) Inventors: Chia-Hui Tai, New Taipei (TW); Hsien-Chiu Jao, New Taipei (TW)

(73) Assignee: FOXTRON VEHICLE TECHNOLOGIES CO., LTD., New Taipei (TW)

(*) Notice: Subject to any disclaimer, the term of this patent is extended or adjusted under 35 U.S.C. 154(b) by 151 days.

(21) Appl. No.: 18/398,195

(22) Filed: Dec. 28, 2023

(65) Prior Publication Data

US 2025/0121654 A1  Apr. 17, 2025

(30) Foreign Application Priority Data

Oct. 13, 2023 (TW) ................................. 112139253

(51) Int. Cl.
 *B60H 1/00* (2006.01)

(52) U.S. Cl.
 CPC ................................. *B60H 1/00885* (2013.01)

(58) Field of Classification Search
 CPC ............ B60H 1/00885; B60H 1/00278; B60H 1/00907
 See application file for complete search history.

(56) References Cited

U.S. PATENT DOCUMENTS

| | | | |
|---|---|---|---|
| 9,533,544 B2 | 1/2017 | Johnston | |
| 2018/0178615 A1* | 6/2018 | Xia | ..................... H01M 10/486 |
| 2022/0097478 A1 | 3/2022 | Dong | |
| 2023/0158858 A1* | 5/2023 | Kim | .................. B60H 1/00764 62/186 |

FOREIGN PATENT DOCUMENTS

| | | | | |
|---|---|---|---|---|
| CN | 113400893 A | | 9/2021 | |
| CN | 115214289 A | * | 10/2022 | ......... B60H 1/00271 |
| CN | 115703321 A | | 2/2023 | |

OTHER PUBLICATIONS

FOR1, Thermal management system and vehicle, 2021, Full Document (Year: 2021).*

* cited by examiner

*Primary Examiner* — Nael N Babaa
(74) *Attorney, Agent, or Firm* — Li & Cai Intellectual Property Office

(57) ABSTRACT

A thermal management system includes a first fluid channel, a first electrical energy supply device, a second fluid channel, a first heat exchange device, a power device, a first switching device, a third fluid channel, a compression device, a second heat exchange device, a third heat exchange device, and a first expansion element. The first fluid channel accommodates a first fluid. The first electrical energy supply device exchanges heat with the first fluid. The second fluid channel accommodates the first fluid. The first heat exchange device allows the first fluid to exchange heat with an external environment. The power device exchanges heat with the first fluid. The first switching device separates the first fluid channel from the second fluid channel or connects the first fluid channel with the second fluid channel. The third fluid channel accommodates a second fluid.

8 Claims, 4 Drawing Sheets

THERMAL MANAGEMENT SYSTEM

CROSS-REFERENCE TO RELATED PATENT APPLICATION

This application claims the benefit of priority to Taiwan Patent Application No. 112139253, filed on Oct. 13, 2023. The entire content of the above identified application is incorporated herein by reference.

Some references, which may include patents, patent applications and various publications, can be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a thermal management system, and more particularly to a thermal management system adapted to a vehicle.

BACKGROUND OF THE DISCLOSURE

In low temperature environments, since both an electric vehicle cabin and a power battery system have heating needs, the distribution of thermal management between the two can be a difficult issue. At present, there are many ways to distribute the thermal management throughout the vehicle in low temperature environments, some of which involve using two independent heaters, i.e., two heaters respectively disposed for the cabin heating and the power battery heating, which is simple to control but incurs high cost. Another way is to use a single heater; however, this method of thermal distribution is relatively simple, and cannot not be changed along with any changes in the state of the vehicle, and the heat distribution method does not take into account conditions such as the warmth of the cabin and the power battery to dynamically adjust a thermal management distribution strategy.

SUMMARY OF THE DISCLOSURE

In response to the above-referenced technical inadequacies, the present disclosure provides a thermal management system.

In order to solve the above-mentioned problems, one of the technical aspects adopted by the present disclosure is to provide a thermal management system. The thermal management system includes a first fluid channel, a first electrical energy supply device, a second fluid channel, a first heat exchange device, a power device, a first switching device, a third fluid channel, a compression device, a second heat exchange device, a third heat exchange device, and a first expansion element. The first fluid channel is configured to accommodate a first fluid. The first electrical energy supply device is configured such that, when the first fluid is accommodated in the first fluid channel, the first electrical energy supply device is capable of exchanging heat with the first fluid. The second fluid channel is configured to accommodate the first fluid. The first heat exchange device is disposed on the second fluid channel for the first fluid to exchange heat with an external environment. The power device is configured such that, when the first fluid is accommodated in the second fluid channel, the power device is capable of exchanging heat with the first fluid. The first switching device is connected with the first fluid channel and the second fluid channel and has a first state and a second state. When the first switching device is in the first state, the first switching device separates the first fluid channel from the second fluid channel such that each of the first fluid channel and the second fluid channel is a separated closed loop, and when the first switching device is in the second state, the first switching device connects the first fluid channel with the second fluid channel such that the first fluid channel and the second fluid channel form an integrated closed loop. The third fluid channel is configured to accommodate a second fluid. The compression device is disposed on the third fluid channel for compressing the second fluid that flows into the third fluid channel and delivering the second fluid. The second heat exchange device is disposed on the third fluid channel for the second fluid to exchange heat with the external environment. The third heat exchange device is configured such that, when the first fluid is accommodated in the first fluid channel and the second fluid is accommodated in the third fluid channel, the first fluid and the second fluid are capable of exchanging heat through the third heat exchange device. The first expansion element is provided on the third fluid channel for regulating a flow and a pressure of the second fluid that flows into the third heat exchange device.

In one of the possible or preferred embodiments, the thermal management system further includes a drying element. The drying element is disposed on the third fluid channel and between the second heat exchange device and the first expansion element.

In one of the possible or preferred embodiments, the thermal management system further includes an evaporation element and a second expansion element. The evaporation element is disposed on the third fluid channel and connected in parallel with the third heat exchange device and the first expansion element for the second fluid to exchange heat with an interior environment of a cabin of the mobile vehicle. The second expansion element is disposed on the third fluid channel and connected in parallel with the third heat exchange device and the first expansion element for regulating the flow and the pressure of the second fluid that flows into the evaporation element.

In one of the possible or preferred embodiments, the thermal management system further includes a first switching element, a fourth heat exchange device, and a second switching element. The first switching element is disposed on the third fluid channel and located between the compression device and the second heat exchange device for allowing or blocking the flowing of the second fluid from the compression device to the second heat exchange device. The fourth heat exchange device is disposed on the third fluid channel and connected in parallel with the second heat exchange device and the first switching element for the second fluid to exchange heat with an interior environment of a cabin of the mobile vehicle. The second switching element is disposed on the third fluid channel and connected in parallel with the second heat exchange device and the first switching element for allowing or blocking the flowing of the second fluid from the compression device to the fourth heat exchange device.

In one of the possible or preferred embodiments, the thermal management system further includes a third switching element. The third switching element is disposed on the third fluid channel and connected in parallel with the compression device and the first switching element for allowing or blocking the flowing of the second fluid from the second heat exchange device to the compression device.

In one of the possible or preferred embodiments, the thermal management system further includes a unidirectional element and a third expansion element. The unidirectional element is disposed on the third fluid channel and located between the second heat exchange device and the drying element. The third expansion element is disposed on the third fluid channel and connected in parallel with the unidirectional element and the drying element for regulating the flow and the pressure of the second fluid that flows into the second heat exchange device.

In one of the possible or preferred embodiments, the thermal management system further includes a fifth heat exchange device. The fifth heat exchange device is configured such that, when the first fluid is accommodated in the second fluid channel and the second fluid is accommodated in the third fluid channel, the first fluid and the second fluid are capable of exchanging heat through the fifth heat exchange device. The fifth heat exchange device is connected in parallel with the first heat exchange device in the second fluid channel.

In one of the possible or preferred embodiments, the thermal management system further includes a heating module and a second electrical energy supply device. The heating module is configured to heat the first fluid and allow the first fluid to exchange heat with the first electrical energy supply device, so as to increase a temperature of the first electrical energy supply device. The second electrical energy supply device is configured to supply electrical energy to the heating module.

In one of the possible or preferred embodiments, the thermal management system further includes an automated driving computing device. The automated driving computing device is configured such that the automated driving computing device is capable of exchanging heat with the first fluid when the first fluid is accommodated in the first fluid channel.

In one of the possible or preferred embodiments, the thermal management system further includes an active grille system. The active grille system is provided in front of the first heat exchange device in the direction of travel of the mobile vehicle. When the mobile vehicle is travelling, the active grille system controls a flow of air passing through the first heat exchange device.

Therefore, in the thermal management system provided by the present disclosure, by virtue of "a first fluid channel being configured to accommodate a first fluid; a first electrical energy supply device being configured such that, when the first fluid is accommodated in the first fluid channel, the first electrical energy supply device is capable of exchanging heat with the first fluid; a second fluid channel being configured to accommodate the first fluid; a first heat exchange device being disposed on the second fluid channel for the first fluid to exchange heat with the external environment; a power device being configured such that, when the first fluid is accommodated in the second fluid channel, the power device is capable of exchanging heat with the first fluid; a first switching device being connected with the first fluid channel and the second fluid channel and having a first state and a second state; when the first switching device is in the first state, the first switching device separating the first fluid channel from the second fluid channel such that each of the first fluid channel and the second fluid channel is a separated closed loop, and when the first switching device is in the second state, the first switching device connecting the first fluid channel with the second fluid channel such that the first fluid channel and the second fluid channel form an integrated closed loop; a third fluid channel being configured to accommodate a second fluid; a compression device being disposed on the third fluid channel for compressing the second fluid that flows into the third fluid channel and delivering the second fluid; a second heat exchange device being disposed on the third fluid channel for the second fluid to exchange heat with the external environment; a third heat exchange device being configured such that, when the first fluid is accommodated in the first fluid channel and the second fluid is accommodated in the third fluid channel, the first fluid and the second fluid are capable of exchanging heat through the third heat exchange device; a first expansion element being disposed on the third fluid channel for regulating the flow and the pressure of the second fluid that flows into the third heat exchange device," the thermal management efficiency for the mobile vehicle can be improved.

These and other aspects of the present disclosure will become apparent from the following description of the embodiment taken in conjunction with the following drawings and their captions, although variations and modifications therein can be affected without departing from the spirit and scope of the novel concepts of the disclosure.

BRIEF DESCRIPTION OF THE DRAWINGS

The described embodiments can be better understood by reference to the following description and the accompanying drawings, in which.

DETAILED DESCRIPTION OF THE EXEMPLARY EMBODIMENTS

Figure 1:
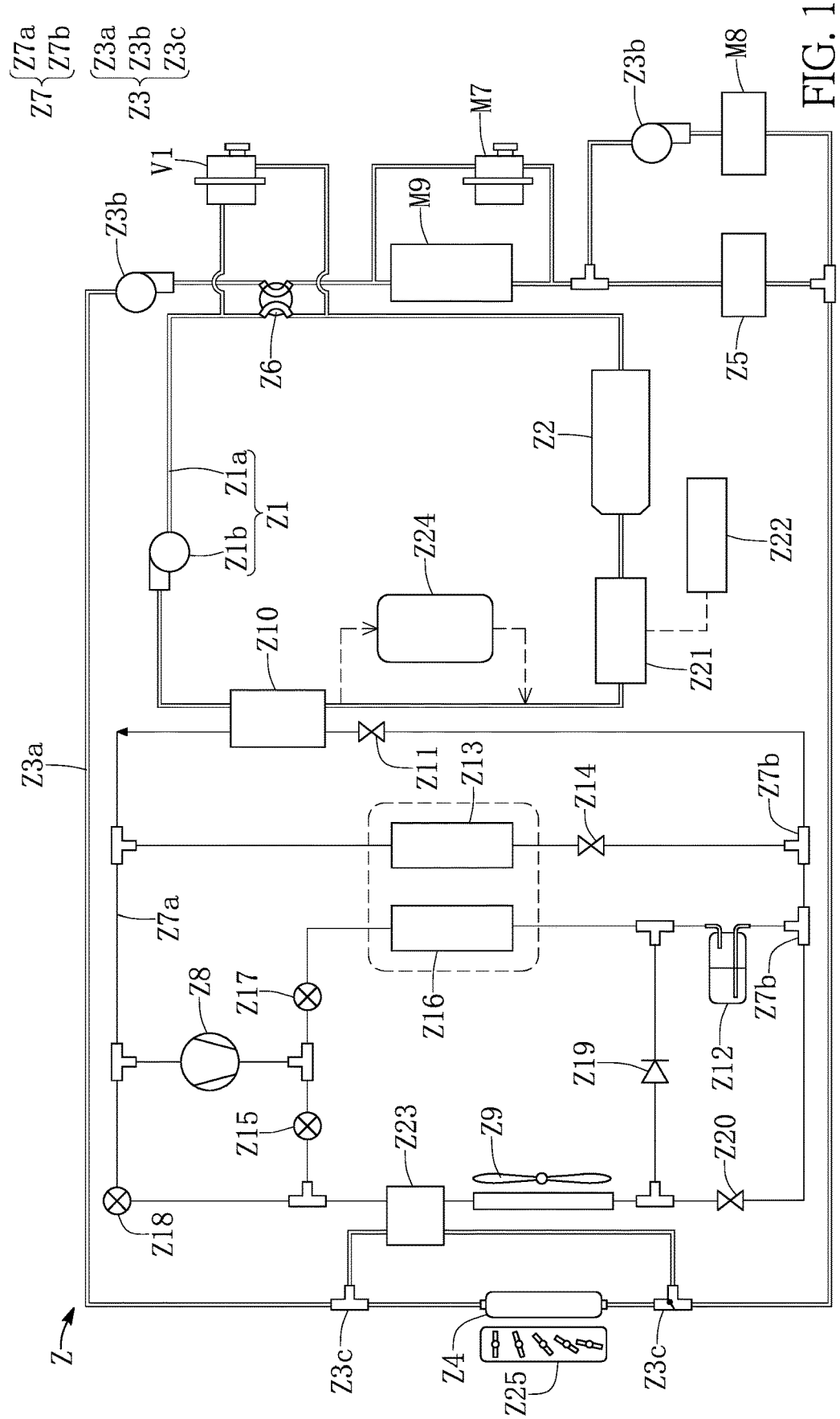
FIG. 1 is a schematic view illustrating a loop of a thermal management system according to the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

Embodiments

Referring to FIG. 1 to FIG. 4, FIG. 1 to FIG. 4 are respectively a schematic view illustrating a loop of a thermal management system, a functional block diagram of the thermal management system, a flowchart illustrating steps of a controlling process for the thermal management system, and another flowchart illustrating the steps of the controlling process for the thermal management system according to the present disclosure. As shown in the aforementioned figures, one embodiment of the present disclosure provides a thermal management system Z that is adapted to a mobile vehicle M. The thermal management system Z includes a first fluid channel Z1, a first electrical energy supply device Z2, a second fluid channel Z3, a first heat exchange device Z4, a power device Z5, a first switching device Z6, a third fluid channel Z7, a compression device Z8, a second heat exchange device Z9, a third heat exchange device Z10, and a first expansion element Z11.

Figure 2:
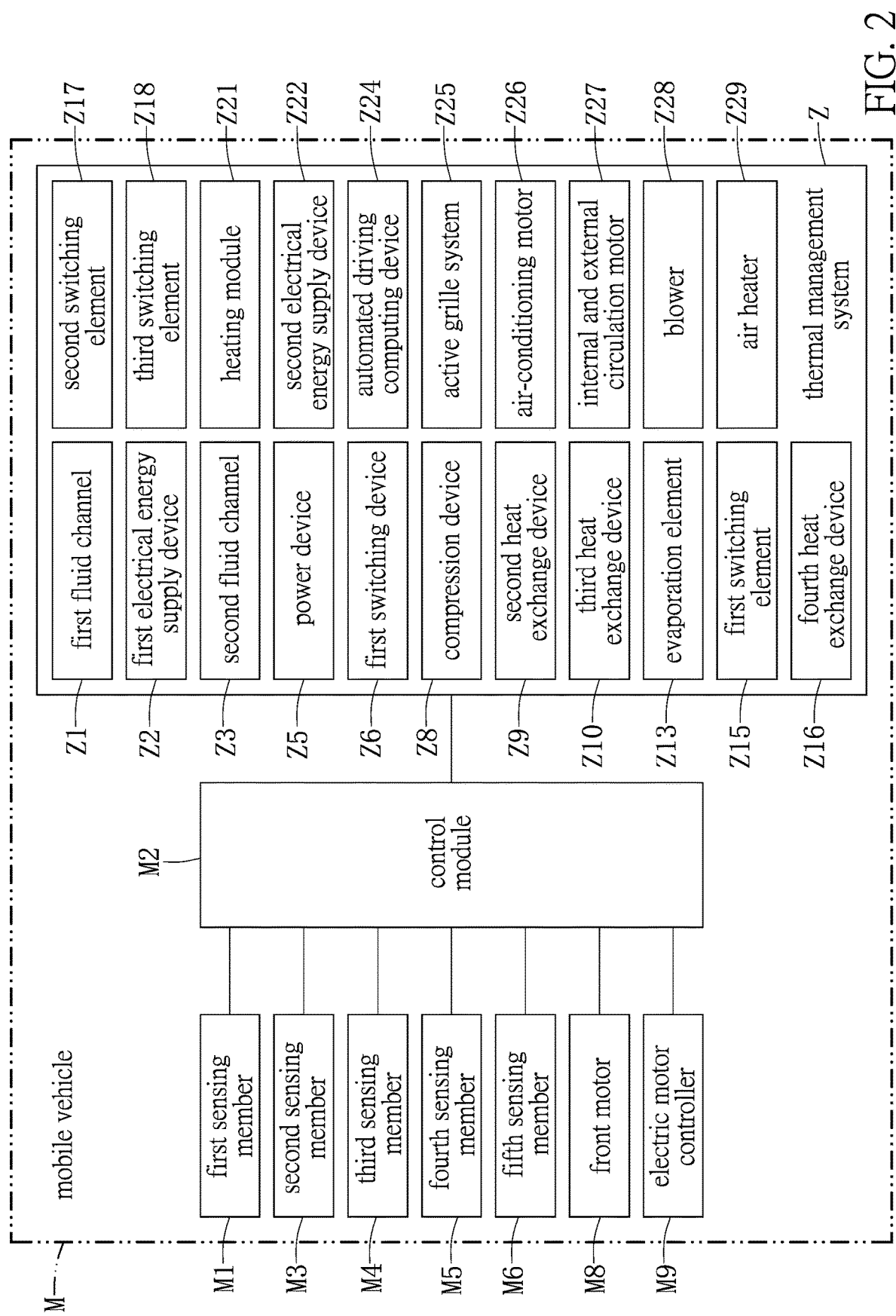
FIG. 2 is a functional block diagram of the thermal management system according to the present disclosure.
Figure 3:
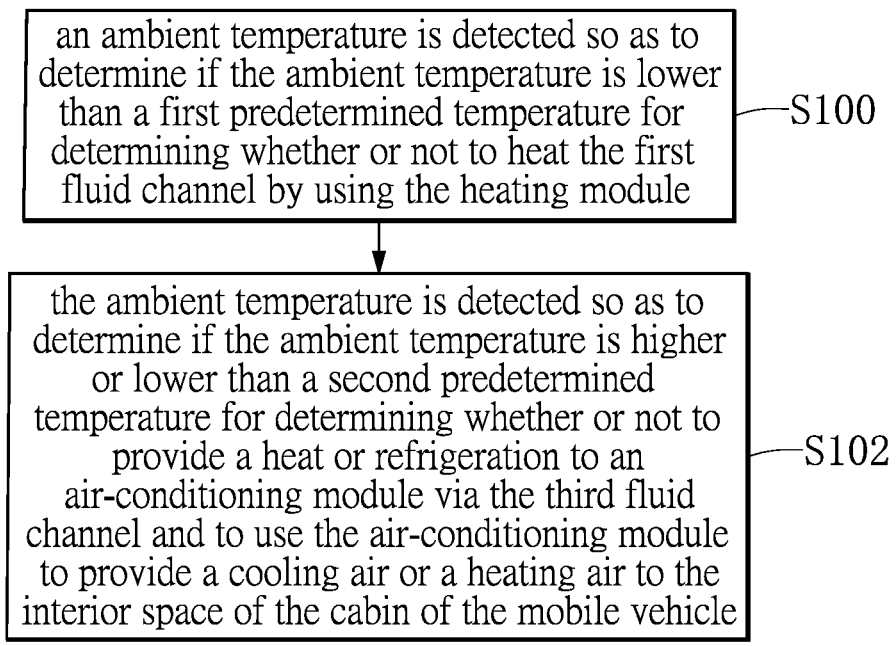
FIG. 3 is a flowchart illustrating steps of a controlling process for the thermal management system according to the present disclosure.
Figure 4:
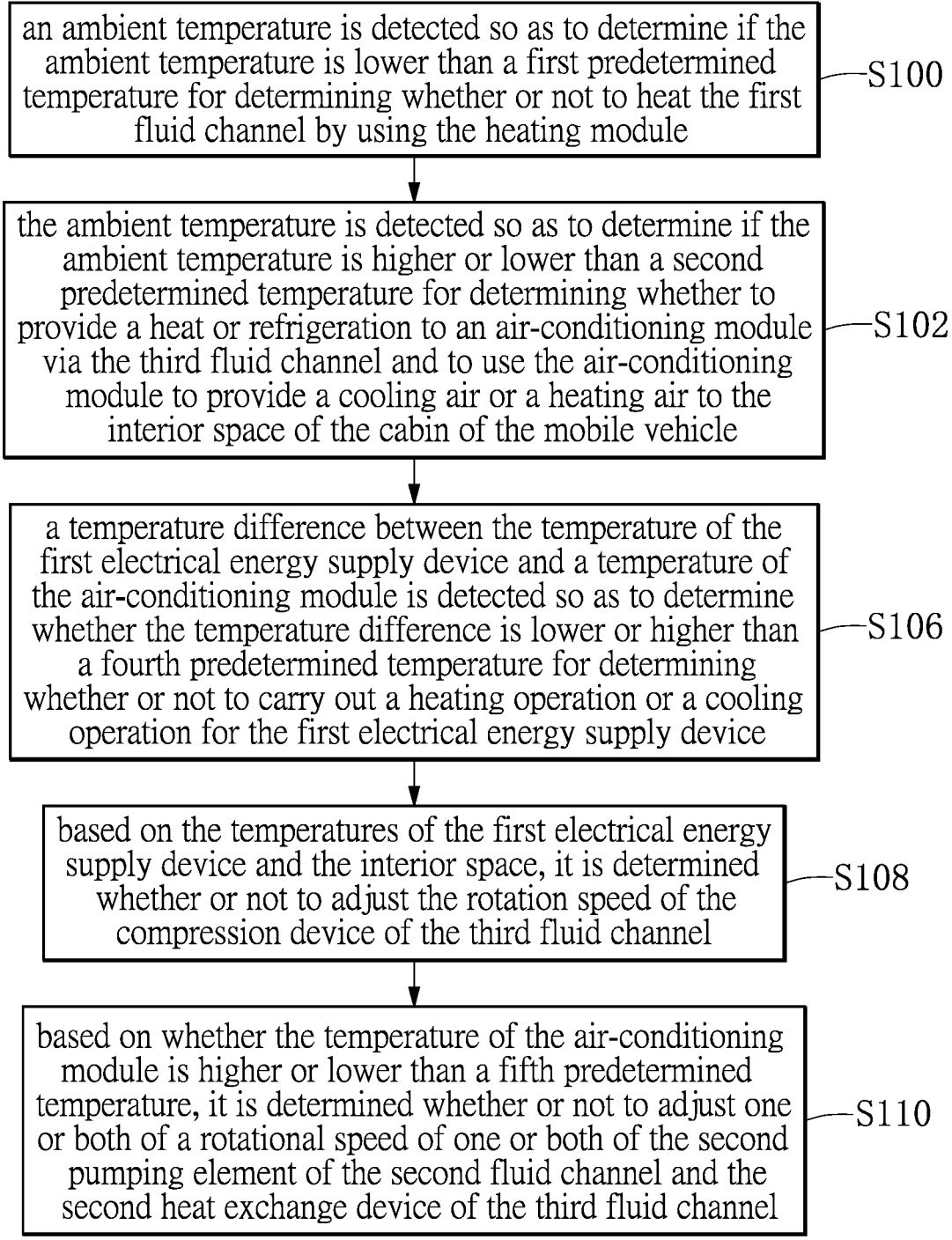
FIG. 4 is another flowchart illustrating the steps of the controlling process for the thermal management system according to the present disclosure.

As shown in FIG. 1 to FIG. 3, the first fluid channel Z1 accommodates a first fluid. The first fluid channel Z1 can include a first piping element Z1a and a first pumping element Z1b. The first piping element Z1a can be a piping structure, and the first fluid can be located in the first piping element Z1a. The first piping element Z1a can be a piping having a single loop, and the first fluid can be water or other types of fluid, but it is not limited thereto. The first pumping element Z1b can be a water pump or other types of pumps, and the first pumping element Z1b can be disposed on the first piping element Z1a.

Then, as shown in FIG. 1 to FIG. 3, the first electrical energy supply device Z2 is configured such that, when the first fluid is accommodated in the first fluid channel Z1, the first electrical energy supply device Z2 can exchange heat with the first fluid. For example, the first electrical energy supply device Z2 can be disposed on the first fluid channel Z1. Specifically, a channel can be designed in a battery pack structure to allow the first fluid to pass through the channel. The first electrical energy supply device Z2 can be a battery module (also referred to as a battery pack or a power battery) that provides the energy (i.e., electrical power) required by power apparatuses of the mobile vehicle M.

Furthermore, as shown in FIG. 1 to FIG. 3, the second fluid channel Z3 accommodates the first fluid. For example, the second fluid channel Z3 can include a second piping element Z3a, at least one second pumping element Z3b, and a plurality of second multidirectional elements Z3c. The second piping element Z3a can be a piping structure such that the second piping element Z3a can be used to accommodate the first fluid. The second piping element Z3a can be a piping having one or more loops, but it is not limited thereto. The second pumping element Z3b can be a water pump or other types of pumps, and the second pumping element Z3b can be disposed on the second piping element Z3a. The second multidirectional element Z3c can be a three-way pipe and can be disposed on the second piping element Z3a.

As shown in FIG. 1 to FIG. 3, the first heat exchange device Z4 is disposed on the second fluid channel Z3 for the first fluid to exchange heat with an external environment. For example, the first heat exchange device Z4 can be a main heat sink and can be disposed on the second piping element Z3a of the second fluid channel Z3. The first heat exchange device Z4 can allow the first fluid in the second piping element Z3a to exchange heat with the environment external to the mobile vehicle M.

As shown in FIG. 1 to FIG. 3, the power device Z5 is configured such that, when the first fluid is accommodated in the second fluid channel Z3, the power device Z5 is capable of exchanging heat with the first fluid. For example, the power device Z5 can be a driving motor module for rear wheels of the mobile vehicle M, but it is not limited thereto. The power device Z5 can be disposed on the second piping element Z3a of the second fluid channel Z3. For example, a channel can be formed in the driving motor module to allow the first fluid to pass through the channel.

Moreover, as shown in FIG. 1 to FIG. 3, the first switching device Z6 is connected with the first fluid channel Z1 and the second fluid channel Z3 and has a first state and a second state. When the first switching device Z6 is in the first state, the first switching device Z6 separates the first fluid channel Z1 from the second fluid channel Z3 such that each of the first fluid channel Z1 and the second fluid channel Z3 is a separated closed loop. When the first switching device Z6 is in the second state, the first switching device Z6 connects the first fluid channel Z1 with the second fluid channel Z3 such that the first fluid channel Z1 and the second fluid channel Z3 form an integrated closed loop. For example, the first switching device Z6 can be a four-way valve body, and the first switching device Z6 connects the second piping element Z3a of the second fluid channel Z3 with the first piping element Z1a of the first fluid channel Z1.

In addition, as shown in FIG. 1 to FIG. 3, a third fluid channel Z7 accommodates the second fluid. For example, the third fluid channel Z7 can include a third piping element Z7a. The third piping element Z7a can be a piping structure, and the second fluid can be located in the third piping element Z7a. The third piping element Z7a can be a piping having one or more loops, and the second fluid can be ammonia, sulfur dioxide, non-halogenated hydrocarbons, or other types of fluid, but it is not limited thereto. The third fluid channel Z7 can further include a plurality of third multidirectional elements Z7b. The plurality of third multidirectional elements Z7b can be disposed on the third piping element Z7a, and the plurality of third multidirectional elements Z7b can be three-way pipes.

As shown in FIG. 1 to FIG. 3, the compression device Z8 is disposed on the third fluid channel Z7 for compressing the second fluid that flows into the third fluid channel Z7 and delivering the second fluid. For example, the compression device Z8 can be a compressor disposed in the third piping element Z7a of the third fluid channel Z7.

As shown in FIG. 1 to FIG. 3, the second heat exchange device Z9 is disposed on the third fluid channel Z7 for the second fluid to exchange heat with the external environment. For example, the second heat exchange device Z9 can be one or a combination of a condenser and a fan. The second heat exchange device Z9 can be disposed on the third piping element Z7a of the third fluid channel Z7 and can allow the second fluid in the third piping element Z7a to exchange heat with the environment external to the mobile vehicle M.

As shown in FIG. 1 to FIG. 3, the third heat exchange device Z10 is configured such that, when the first fluid is accommodated in the first fluid channel Z1 and the second fluid is accommodated in the third fluid channel Z7, the first fluid and the second fluid are capable of exchanging heat through the third heat exchange device Z10. For example, the third heat exchange device Z10 can be disposed on the first piping element Z1a of the first fluid channel Z1 and the third piping element Z7a of the third fluid channel Z7. The third heat exchange device Z10 can be a refrigerant heat exchanger or other types of heat exchanger.

As shown in FIG. 1 to FIG. 3, the first expansion element Z11 is disposed on the third fluid channel Z7 for regulating a flow and a pressure of the second fluid that flows into the third heat exchange device Z10. For example, the first expansion element Z11 can be an expansion valve and can be disposed on the third piping element Z7a of the third fluid channel Z7.

Furthermore, the thermal management system Z includes a drying element Z12 that is disposed on the third fluid channel Z7 and between the second heat exchange device Z9 and the first expansion element Z11. For example, the drying element Z12 can be located on the third piping element Z7a of the third fluid channel Z7. The drying element Z12 can be a drier bottle.

Moreover, the thermal management system Z includes an evaporation element Z13 and a second expansion element Z14. The evaporation element Z13 is disposed on the third fluid channel Z7 and connected in parallel with the third heat exchange device Z10 and the first expansion element Z11 for the second fluid to exchange heat with an interior environment of a cabin of the mobile vehicle M. The second expansion element Z14 is disposed on the third fluid channel Z7 and connected in parallel with the third heat exchange device Z10 and the first expansion element Z11 for regulating the flow and the pressure of the second fluid that flows into the evaporation element Z13. For example, the evaporation element Z13 can be an evaporator, and the second expansion element Z14 can be an expansion valve and can be disposed on the third piping element Z7a of the third fluid channel Z7.

In addition, the thermal management system Z includes a first switching element Z15, a fourth heat exchange device Z16, and a second switching element Z17. The first switching element Z15 is disposed on the third fluid channel Z7 and located between the compression device Z8 and the second heat exchange device Z9 for allowing or blocking the flowing of the second fluid from the compression device Z8 to the second heat exchange device Z9. The fourth heat exchange device Z16 is disposed on the third fluid channel Z7 and connected in parallel with the second heat exchange device Z9 and the first switching element Z15 for the second fluid to exchange heat with the interior environment of the cabin of the mobile vehicle M. The second switching element Z17 is disposed on the third fluid channel Z7 and connected in parallel with the second heat exchange device Z9 and the first switching element Z15 for allowing or blocking the flowing of the second fluid from the compression device Z8 to the fourth heat exchange device Z16. For example, the first switching element Z15 can be located on the third piping element Z7a of the third fluid channel Z7, and the first switching element Z15 can be a solenoid valve. The fourth heat exchange device Z16 can be an internal condenser. The second switching element Z17 can be located on the third piping element Z7a of the third fluid channel Z7, and the second switching element Z17 can be a solenoid valve.

Furthermore, the thermal management system Z includes a third switching element Z18 that is disposed on the third fluid channel Z7 and connected in parallel with the compression device Z8 and the first switching element Z15 for allowing or blocking the flowing of the second fluid from the second heat exchange device Z9 to the compression device Z8. For example, the third switching element Z18 can be located on the third piping element Z7a of the third fluid channel Z7, and the third switching element Z18 can be a solenoid valve.

Moreover, the thermal management system Z includes a unidirectional element Z19 and a third expansion element Z20. The unidirectional element Z19 is disposed on the third fluid channel Z7 and located between the second heat exchange device Z9 and the drying element Z12. The third expansion element Z20 is disposed on the third fluid channel Z7 and connected in parallel with the unidirectional element Z19 and the drying element Z12 for regulating the flow and the pressure of the second fluid that flows into the second heat exchange device Z9. For example, the unidirectional element Z19 can be a unidirectional valve. The third expansion element Z20 can be an expansion valve and can be disposed on the third piping element Z7a of the third fluid channel Z7.

In addition, the thermal management system Z includes a heating module Z21 and a second electrical energy supply device Z22. The heating module Z21 is configured to heat the first fluid and allow the first fluid to exchange heat with the first electrical energy supply device Z2, so as to raise a temperature of the first electrical energy supply device Z2. The second electrical energy supply device Z22 is configured to supply electrical energy to the heating module Z21. For example, the heating module Z21 is located on the first piping element Z1a of the first fluid channel Z1, and the heating module Z21 can be a water heater. The second electrical energy supply device Z22 can be electrically connected to the heating module Z21 to provide electrical energy to the heating module Z21, and the second electrical energy supply device Z22 can be a lead-acid battery or a lithium battery.

Accordingly, the present disclosure further provides a controlling process for the thermal management system Z for being applied to the mobile vehicle M, and the controlling process at least includes the following steps.

First, an ambient temperature is detected so as to determine if the ambient temperature is lower than a first predetermined temperature for determining whether or not to heat the first fluid channel Z1 by using the heating module Z21, and then the first electrical energy supply device Z2 of the mobile vehicle M is heated by using the first fluid channel Z1 (step S100).

For example, as shown in FIG. 1 to FIG. 3, the controlling process of the thermal management system Z of the present disclosure can be applied to a mobile vehicle M and the aforementioned thermal management system Z of the present disclosure. The mobile vehicle M can be a vehicle with four or more wheels and using an electric energy as the power source. That is, the mobile vehicle M can be an electric vehicle, but it is not limited thereto. The thermal management system Z of the present disclosure can also be applied to the mobile vehicle M.

Therefore, the mobile vehicle M can detect the ambient temperature external (i.e., outside the vehicle) to the mobile vehicle M by using a first sensing module M1 of the mobile vehicle M before the mobile vehicle M is started. Then, the control module M2 of the mobile vehicle M determines whether or not the ambient temperature sensed by the first sensing module M1 is lower than the first predetermined temperature. If the control module M2 determines that the ambient temperature is lower than the first predetermined temperature, the control module M2 can drive the heating module Z21 to heat the first fluid channel Z1 and the first fluid within the first fluid channel Z1 to transfer a heat to the first electrical energy supply device Z2 by using the first fluid and the first piping element Z1a, thereby heating the first electrical energy supply device Z2.

Furthermore, the step S100 of heating the first electrical energy supply device Z2 in the controlling process of the thermal management system Z of the present disclosure further includes the following steps.

When the ambient temperature is determined to be lower than the first predetermined temperature, the control module M2 drives the heating module Z21 to heat the first fluid channel Z1.

Next, the ambient temperature is detected so as to determine if the ambient temperature is higher or lower than a second predetermined temperature for determining whether to provide a heat or refrigeration to an air-conditioning module via the third fluid channel Z7 and to use the air-conditioning module to provide a cooling air or a heating air to the interior space of the cabin of the mobile vehicle M (step S102).

For example, as shown in FIG. 1 to FIG. 3, after the heating of the first electrical energy supply device Z2, or after the temperature of the first electrical energy supply device Z2 reaches an operating temperature, the control module M2 can be utilized to determine whether or not the ambient temperature sensed by the first sensing module M1 is lower than the second predetermined temperature. When the control module M2 determines that the ambient temperature is lower than the second predetermined temperature, the control module can drive the compression device Z8 and the first expansion element Z11 to operate in order to provide a heat to the air-conditioning module through the second fluid of the third fluid channel Z7, the third piping element Z7a, and the second heat exchange device Z9. Therefore, a blower Z28 and the evaporation element Z13 of the air-conditioning module supply warm air to the interior space (not shown in the figures) of the cabin of the mobile vehicle. It should be noted that the thermal management system Z can further include an air-conditioning motor Z26, an internal and external circulation motor Z27, the blower Z28, and an air heater Z29. The air-conditioning motor Z26, the internal and external circulation motor Z27, the blower Z28, and the air heater Z29, the evaporation element Z13, and the fourth heat exchange device Z16 can form an air-conditioning module that can be an assembly of a heating, ventilation, and air-conditioning (HVAC) apparatus, and the air-conditioning module can be connected to the control module M2.

Furthermore, when the control module M2 determines that the ambient temperature is higher than the second predetermined temperature, the control module M2 can drive the compression device Z8 and the first expansion element Z11 to operate in order to provide refrigeration to the air-conditioning module through the second fluid of the third fluid channel Z7, the third piping element Z7a, and the second heat exchange device Z9. Therefore, the blower Z28 and the evaporation element Z13 of the air-conditioning module supply warm air to the interior space of the cabin of the mobile vehicle M.

In addition, the thermal management system Z further includes a fifth heat exchange device Z23. The fifth heat exchange device Z23 is configured such that, when the first fluid is accommodated in the second fluid channel Z3 and the second fluid is accommodated in the third fluid channel Z7, the first fluid and the second fluid are capable of exchanging heat through the fifth heat exchange device Z23. The fifth heat exchange device Z23 is connected in parallel with the first heat exchange device Z4 in the second fluid channel Z3. For example, the fifth heat exchange device Z23 can be disposed in the third piping element Z7a of the third fluid channel Z7 and the second piping element Z3a of the second fluid channel Z3, and the fifth heat exchange device Z23 can be a refrigerant heat exchanger or other types of heat exchangers.

Furthermore, the thermal management system Z includes an automated driving computing device Z24 configured such that the automated driving computing device Z24 is capable of exchanging heat with the first fluid when the first fluid is accommodated in the first fluid channel Z1. For example, the automated driving computing device Z24 can be disposed in the first piping element Z1a of the first fluid channel Z1 and connected to the control module M2, and the automated driving computing device Z24 is used to generate a heat by performing an algorithmic operation. The automated driving computing device Z24 can be an automated driving computing module.

Moreover, the thermal management system Z further includes an active grille system Z25 that is provided in front of the first heat exchange device Z4 in a direction of travel of the mobile vehicle M. When the mobile vehicle M travels, the active grille system Z25 controls a flow of air passing through the first heat exchange device Z4. For example, the active grille system Z25 can be an active air intake grille module and can be mounted at the front of the mobile vehicle M.

In addition, the controlling process for the thermal management system Z of the present disclosure may also include the following steps.

The temperature of the second fluid channel Z3 is detected so as to determine whether or not the temperature of the second fluid channel Z3 is higher than a third predetermined temperature for determining whether or not the first switching device Z6 is driven to connect the second fluid channel Z3 with the first fluid channel Z1, or to transfer the heat from the second fluid channel Z3 to the third fluid channel Z7 through the fifth heat exchange device Z23 (step S104).

For example, as shown in FIG. 1 to FIG. 4, the thermal management system Z of the present disclosure can utilize a second sensing member M3 of the mobile vehicle M to sense a temperature of the second piping element Z3a, or a temperature of the first fluid in the second piping element Z3a, and determine, by using the control module M2, whether or not the temperature sensed by the second sensing member M3 is higher than the third predetermined temperature. If the control module M2 determines that the temperature is higher than the third predetermined temperature, the control module M2 can drive the first switching device Z6 to be in an on state such that the second fluid channel Z3 communicates with the first fluid channel Z1, and the heat of the second fluid channel Z3 can be transferred to the first fluid channel Z1. Moreover, the heat can also be transferred to the first fluid channel Z1 by utilizing the fifth heat exchange device Z23, thereby achieving an effect of heat recovery.

Furthermore, the controlling process for the thermal management system Z of the present disclosure can include the following steps.

A temperature difference between the temperature of the first electrical energy supply device Z2 and a temperature of the air-conditioning module is detected so as to determine whether the temperature difference is lower or higher than a fourth predetermined temperature for determining whether or not to carry out a heating operation or a cooling operation for the first electrical energy supply device Z2 (step S106). The first electrical energy supply device Z2 can be heated or cooled by conventional means, and a person of ordinary skill in the art can adapt suitable ways of heating or cooling based on practical requirements and hardware configurations.

For example, as shown in FIG. 1 to FIG. 4, a third sensing member M4 of the mobile vehicle M can be electrically connected to the control module M2, and the third sensing member M4 is used to sense the temperature of the first electrical energy supply device Z2. The third sensing member M4 can be a temperature sensor, and the third sensing member M4 can be disposed on the first electrical energy supply device Z2. A fourth sensing member M5 of the mobile vehicle M can be electrically connected to the control module M2, and the fourth sensing member M5 is used to sense the temperature of the air-conditioning module. The fourth sensing member M5 can be a temperature sensor, and the fourth sensing member M5 can be disposed on the air-conditioning module. The control module M2 determines whether or not a temperature difference between the temperature of the first electrical energy supply device Z2 and the temperature of the air-conditioning module is higher than the fourth predetermined temperature to determine whether or not to carry out a heating operation or a cooling operation on the first electrical energy supply device Z2.

Furthermore, the controlling process for the thermal management system Z of the present disclosure can also include the following steps.

Based on the temperatures of the first electrical energy supply device Z2 and the interior space, it is determined whether or not to adjust the rotation speed of the compression device Z8 of the third fluid channel Z7 (step S108). According to practical requirements and hardware configurations, a person of ordinary skill in the art can adopt appropriate conditions, such as temperature, for accordingly controlling the compression device Z8.

For example, as shown in FIG. 1 to FIG. 4, a fifth sensing member M6 of the mobile vehicle M can be electrically connected to the control module M2, and the fifth sensing member M6 is used to sense the temperature of the interior space of the mobile vehicle M. The fifth sensing member M6 can be a temperature sensor, and the fifth sensing member M6 can be located in the interior space. The control module M2 determines whether or not to adjust the rotation speed of the compression device Z8 of the third fluid channel Z7 based on the temperatures of the first electrical energy supply device Z2 and the temperature of the interior space.

Furthermore, the controlling process for the thermal management system Z of the present disclosure can also include the following steps.

Based on whether the temperature of the air-conditioning module is higher or lower than a fifth predetermined temperature, it is determined whether or not to adjust one or both of a rotational speed of one or both of the second pumping element Z3b of the second fluid channel Z3 and the second heat exchange device Z9 of the third fluid channel Z7 (step S110).

For example, referring to FIG. 1 to FIG. 4, the thermal management system Z of the present disclosure can sense the temperature of the air-conditioning module by using the fourth sensing member M5 and determine whether or not the temperature of the air-conditioning module is higher or lower than the fifth predetermined temperature by using the control module M2. If the control module M2 determines that the temperature of the air-conditioning module is higher than the fifth predetermined temperature, the control module M2 can drive at least one of the second pumping element Z3b and the second heat exchange device Z9 to increase a current rotation speed of the one of the second pumping element Z3b and the second heat exchange device Z9, so as to accelerate the cooling rate for the air-conditioning module. If the control module M2 determines that the temperature of the air-conditioning module is lower than the fifth predetermined temperature, the control module M2 can drive the second pumping element Z3b and the second heat exchange device Z9 to maintain the current rotational speed or drive at least one of the second pumping element Z3b and the second heat exchange device Z9 to decrease the current rotation speed of the one of the second pumping element Z3b and the second heat exchange device Z9.

Furthermore, in the step S100 of heating the first electrical energy supply device Z2, the controlling process for the thermal management system Z of the present disclosure further includes the following steps.

When the ambient temperature is determined to be lower than the first predetermined temperature, the automated driving computing device Z24 performs an algorithmic operation to generate a heat that is then provided to the first fluid channel Z1.

For example, as shown in FIG. 1 to FIG. 4, the thermal management system Z of the present disclosure can include the automated driving computing device Z24 that is disposed in the first fluid channel Z1 and connected to a control module M2, and the automated driving computing device Z24 is used to generate a heat by performing a computing operation. The automated driving computing device Z24 can be an automated driving computing module. The control module M2 determines whether or not the ambient temperature sensed by the first sensing module M1 is lower than the first predetermined temperature, and determines whether or not to drive the automated driving computing device Z24 to perform a computing operation. The automated driving computing device Z24 performing the computing operation provides the heat to the first fluid channel Z1 and heats the first electrical energy supplying device Z2 by using the first fluid channel Z1. Therefore, when the control module M2 of the thermal management system Z of the present disclosure determines that the ambient temperature is lower than the first predetermined temperature, the control module M2 can drive the automated driving computing device Z24 to perform the computing operation for providing the heat to the first fluid channel Z1.

Therefore, by the aforementioned technical solutions, the thermal management system Z and the controlling process for the thermal management system Z of the present disclosure can overcome limitations of a heat pump heating system (i.e., the third fluid channel Z7) being unable to operate at low temperatures by utilizing the characteristic of lead-acid batteries (i.e., the second electrical energy supply device Z22) that are able to discharge at low temperatures, so as to control a battery, motor, and electric control system (which can be collectively referred to as an EIC system) and the air-conditioning module to be in a temperature range in which the EIC system is highly efficient. This overcomes a use case in which the first electrical energy supply device Z2 cannot discharge power, and is applicable to use cases under temperatures of from 45° C. in a high-temperature environment to −20° C. in a low-temperature environment. Moreover, when the mobile vehicle M travels in an extremely low temperature, the automated driving computing device Z24 can be activated to perform an automated driving algorithm operation for providing heat to the first electrical energy supply device Z2, such that the first electrical energy supply device Z2 reaches an operating temperature and then activates the heat pump heating system. Moreover, the heat pump heating system can reduce the power consumption of an air-conditioner of the cabin by recovering heat through the refrigerant heat exchangers (i.e., the third heat exchange device Z10 and the fifth heat exchange device Z23) and the second heat exchange device Z9. In addition, the power consumption of the heating of the first electrical energy supply device Z2 can be reduced by recovering the waste heat of electric motors through the third fluid channel Z7 and by retaining the temperature of the first electrical energy supply device Z2.

Further, based on the aforementioned technical solutions, the thermal management system Z and the controlling process for the thermal management system Z the present disclosure may also have the following modes:

(1) A heating mode under an extremely low temperature: A lead-acid battery activates a battery water heater (i.e., the heating module Z21) to increase a temperature of a battery pack (i.e., the first electrical energy supply device Z2) to the operating temperature, and the cabin is switched to a heating mode through a refrigerant loop (i.e., the third fluid channel Z7). The refrigerant (i.e., the second fluid) absorbs the heat from the atmosphere through the second heat exchange device Z9, and a heat exchanger (i.e. the evaporation element Z13) inside the air-conditioning modules heats air inside the cabin air. When the warming capacity is insufficient, the air heater Z29 is further switched on. The loops of the second fluid channel Z3 and the first fluid channel Z1 can be in parallel to each other to reduce the rotation speed of the second pumping element Z3b and increase a rate in which the battery reaches the operating temperature. The loop of the second piping element Z3a is arranged to avoid the water tank and heat dissipation to the atmosphere so as to maintain an optimal operating temperature of the motor (i.e., the air-conditioning module), and is arranged to provide the waste heat to the refrigerant (i.e., the second fluid) through the third heat exchange device Z10. When the temperature of the first electrical energy supply device Z2 reaches the operating temperature, the mobile vehicle M is in a start driving state, and the temperature of the motor (i.e., the air-conditioning module) is equal to or greater than the operating temperature. At this time, the loops of the second fluid channel Z3 and the first fluid channel Z1 can be changed to be in a serial connection, and the temperature of the first fluid channel Z1 is raised to an optimal operating temperature by the waste heat recovered from the second fluid channel Z3. Moreover, the second fluid of the third fluid channel Z7 exchanges heat with the waste heat of the first fluid of the second fluid channel Z3 and the first fluid of the first fluid channel Z1 so as to reduce an output load of a compressor (i.e., the compression device Z8) during cabin warming.

(2) A cooling mode under an extremely high temperature: When the cabin, the battery, and the driving power system need to be cooled, the compression device Z8 of the third fluid channel Z7 and the first switching element Z15 are switched on, and the second fluid channel Z3 and the first fluid channel Z1 are connected in parallel through communication via the first switching device Z6. The refrigerant (a cool air) is transferred to the cabin through the evaporation element Z13 of the air-conditioning motor Z26. The heat from the battery is transferred from cooling water (i.e., the first fluid) to the refrigerant (i.e., the second fluid) through the third heat exchange device Z10, and is then dispersed to the atmosphere from the second heat exchange device Z9. The air-conditioning module is cooled by the cooling water (i.e. the first fluid) carrying the heat to the first heat exchange device Z4 in which the heat is dispersed to the atmosphere. When the battery reaches the optimal operating temperature, the loops of the third fluid channel Z7 and the first fluid channel Z1 are separated from each other and do not perform heat exchange with each other. Moreover, a rotation speed of the first pumping element Z1b can be controlled to be at a specific speed to reduce the cooling demand of the cabin, and the first pumping element Z1b is dedicated for cooling the first electrical energy supply device Z2.

(3) Dehumidification mode: The air in the interior space of the mobile vehicle is heated and then condensed by the fourth heat exchange device Z16 of the air-conditioning module.

(4) De-icing mode: When the external condenser (i.e., the second heat exchange device Z9) is frozen, the refrigerant loop (i.e., the third fluid channel Z7) is switched to a cooling mode. The refrigerant dissipates heat to the atmosphere and melts frost on a surface of the condenser. The refrigerant heat exchanger (i.e., the third heat exchange device Z10) in a battery loop (i.e., the first fluid channel Z1) acts as an evaporator that absorbs the heat from the battery or a water heater (i.e., the heating module Z21) and re-vaporizes the refrigerant into gaseous refrigerant.

Beneficial Effects of the Embodiments

In conclusion, in the thermal management system provided by the present disclosure, by virtue of "a first fluid channel Z1 being configured to accommodate a first fluid; a first electrical energy supply device Z2 being configured such that, when the first fluid is accommodated in the first fluid channel Z1, the first electrical energy supply device Z2 is capable of exchanging heat with the first fluid; a second fluid channel Z3 being configured to accommodate the first fluid; a first heat exchange device Z4 being disposed on the second fluid channel Z3 for the first fluid to exchange heat with the external environment; a power device Z5 being configured such that, when the first fluid is accommodated in the second fluid channel Z3, the power device Z5 is capable of exchanging heat with the first fluid; a first switching device Z6 being connected with the first fluid channel Z1 and the second fluid channel Z3 and having a first state and a second state; when the first switching device Z6 is in the first state, the first switching device Z6 separating the first fluid channel Z1 from the second fluid channel Z3 such that each of the first fluid channel Z1 and the second fluid channel Z3 is a separated closed loop, and when the first switching device Z6 is in the second state, the first switching device Z6 connecting the first fluid channel Z1 with the second fluid channel Z3 such that the first fluid channel Z1 and the second fluid channel Z3 form an integrated closed loop; a third fluid channel Z7 being configured to accommodate a second fluid; a compression device Z8 being disposed on the third fluid channel Z7 for compressing the second fluid that flows into the third fluid channel Z7 and delivering the second fluid; a second heat exchange device Z9 being disposed on the third fluid channel Z7 for the second fluid to exchange heat with the external environment; a third heat exchange device Z10 being configured such that, when the first fluid is accommodated in the first fluid channel Z1 and the second fluid is accommodated in the third fluid channel Z7, the first fluid and the second fluid are capable of exchanging heat through the third heat exchange device Z10; a first expansion element Z11 being disposed on the third fluid channel Z7 for regulating the flow and the pressure of the second fluid that flows into the third heat exchange device Z7," a heating efficiency of the mobile vehicle for batteries in low-temperature environments can be improved.

Furthermore, by the aforementioned technical solutions, the thermal management system Z and the controlling process for the thermal management system Z of the present disclosure can overcome limitations of a heat pump heating system (i.e., the third fluid channel Z7) being unable to operate at low temperatures by utilizing the characteristic of lead-acid batteries (i.e., the second electrical energy supply device Z22) that are able to discharge at low temperatures, so as to control a battery, motor, and electric control system (which can be collectively referred to as an EIC system) and the air-conditioning module to be in a temperature range in which the EIC system is highly efficient. This overcomes a use case in which the first electrical energy supply device Z2 cannot discharge power, and is applicable to use cases under temperatures of from 45° C. in a high-temperature environment to −20° C. in a low-temperature environment. Moreover, when the mobile vehicle M travels in an extremely low temperature, the automated driving computing device Z24 can be activated to perform an automated driving algorithm operation for providing heat to the first electrical energy supply device Z2, such that the first electrical energy supply device Z2 reaches an operating temperature and then activates the heat pump heating system. Moreover, the heat pump heating system can reduce the power consumption of an air-conditioner of the cabin by recovering heat through the refrigerant heat exchangers (i.e., the third heat exchange device Z10 and the fifth heat exchange device Z23) and the second heat exchange device Z9. In addition, the power consumption of the heating of the first electrical energy supply device Z2 can be reduced by recovering the waste heat of electric motors through the third fluid channel Z7 and by retaining the temperature of the first electrical energy supply device Z2.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. A thermal management system for use in a mobile vehicle, wherein the thermal management system comprises:
    a first fluid channel being configured to accommodate a first fluid;
    a first electrical energy supply device being configured such that, when the first fluid is accommodated in the first fluid channel, the first electrical energy supply device is capable of exchanging heat with the first fluid;
    a second fluid channel being configured to accommodate the first fluid;
    a first heat exchange device being disposed on the second fluid channel for the first fluid to exchange heat with an external environment;
    a power device being configured such that, when the first fluid is accommodated in the second fluid channel, the power device is capable of exchanging heat with the first fluid;
    a first switching device being connected with the first fluid channel and the second fluid channel and having a first state and a second state, wherein, when the first switching device is in the first state, the first switching device separates the first fluid channel from the second fluid channel such that each of the first fluid channel and the second fluid channel is a separated closed loop, and when the first switching device is in the second state, the first switching device connects the first fluid channel with the second fluid channel such that the first fluid channel and the second fluid channel form an integrated closed loop;
    a third fluid channel being configured to accommodate a second fluid;
    a compression device being disposed on the third fluid channel for compressing the second fluid that flows into the third fluid channel and delivering the second fluid;
    a second heat exchange device being disposed on the third fluid channel for the second fluid to exchange heat with the external environment;
    a third heat exchange device being configured such that, when the first fluid is accommodated in the first fluid channel and the second fluid is accommodated in the third fluid channel, the first fluid and the second fluid are capable of exchanging heat through the third heat exchange device;
    a first expansion element being disposed on the third fluid channel for regulating a flow and a pressure of the second fluid that flows into the third heat exchange device; and
    another heat exchange device disposed on the second fluid channel and configured such that, when the first fluid is accommodated in the second fluid channel and the second fluid is accommodated in the third fluid channel, the first fluid and the second fluid are capable of exchanging heat through the heat exchange device;
    wherein the heat exchange device being connected in parallel with the first heat exchange device in the second fluid channel.

2. The thermal management system according to claim 1, further comprising:
    a drying element being disposed on the third fluid channel and between the second heat exchange device and the first expansion element.

3. The thermal management system according to claim 2, further comprising:
    an evaporation element being disposed on the third fluid channel and connected in parallel with the third heat exchange device and the first expansion element for the second fluid to exchange heat with an interior environment of a cabin of the mobile vehicle; and
    a second expansion element being disposed on the third fluid channel and connected in parallel with the third heat exchange device and the first expansion element for regulating the flow and the pressure of the second fluid that flows into the evaporation element.

4. The thermal management system according to claim 1, further comprising:
    a heating module being configured to heat the first fluid and allow the first fluid to exchange heat with the first electrical energy supply device, so as to increase a temperature of the first electrical energy supply device; and a second electrical energy supply device is configured to supply electrical energy to the heating module.

5. The thermal management system according to claim 1, further comprising:
an active grille system being provided in front of the first heat exchange device in a direction of travel of the mobile vehicle; wherein, when the mobile vehicle travels, the active grille system controls a flow of air passing through the first heat exchange device.

6. A thermal management system for use in a mobile vehicle, wherein the thermal management system comprises:
a first fluid channel being configured to accommodate a first fluid;
a first electrical energy supply device being configured such that, when the first fluid is accommodated in the first fluid channel, the first electrical energy supply device is capable of exchanging heat with the first fluid;
a second fluid channel being configured to accommodate the first fluid;
a first heat exchange device being disposed on the second fluid channel for the first fluid to exchange heat with an external environment;
a power device being configured such that, when the first fluid is accommodated in the second fluid channel, the power device is capable of exchanging heat with the first fluid;
a first switching device being connected with the first fluid channel and the second fluid channel and having a first state and a second state, wherein, when the first switching device is in the first state, the first switching device separates the first fluid channel from the second fluid channel such that each of the first fluid channel and the second fluid channel is a separated closed loop, and when the first switching device is in the second state, the first switching device connects the first fluid channel with the second fluid channel such that the first fluid channel and the second fluid channel form an integrated closed loop;
a third fluid channel being configured to accommodate a second fluid;
a compression device being disposed on the third fluid channel for compressing the second fluid that flows into the third fluid channel and delivering the second fluid;
a second heat exchange device being disposed on the third fluid channel for the second fluid to exchange heat with the external environment;
a third heat exchange device being configured such that, when the first fluid is accommodated in the first fluid channel and the second fluid is accommodated in the third fluid channel, the first fluid and the second fluid are capable of exchanging heat through the third heat exchange device;
a first expansion element being disposed on the third fluid channel for regulating a flow and a pressure of the second fluid that flows into the third heat exchange device;
a drying element being disposed on the third fluid channel and between the second heat exchange device and the first expansion element;
a first switching element being disposed on the third fluid channel and located between the compression device and the second heat exchange device for allowing or blocking the flowing of the second fluid from the compression device to the second heat exchange device;
a fourth heat exchange device being disposed on the third fluid channel and connected in parallel with the second heat exchange device and the first switching element for the second fluid to exchange heat with an interior environment of a cabin of the mobile vehicle; and
a second switching element being disposed on the third fluid channel and connected in parallel with the second heat exchange device and the first switching element for allowing or blocking the flowing of the second fluid from the compression device to the fourth heat exchange device.

7. The thermal management system according to claim 6, further comprising:
a third switching element being disposed on the third fluid channel and connected in parallel with the compression device and the first switching element for allowing or blocking the flowing of the second fluid from the second heat exchange device to the compression device.

8. The thermal management system according to claim 6, further comprising:
a unidirectional element being disposed on the third fluid channel and located between the second heat exchange device and the drying element; and
a third expansion element being disposed on the third fluid channel and connected in parallel with the unidirectional element and the drying element for regulating the flow and the pressure of the second fluid that flows into the second heat exchange device.

* * * * *